United States Patent
Atkins et al.

(10) Patent No.: US 12,455,910 B1
(45) Date of Patent: Oct. 28, 2025

(54) CONTROLLED PROBABILISTIC SENTENCE SPACE EXPANSION

(71) Applicant: U.S. Bancorp, National Association, Minneapolis, MN (US)

(72) Inventors: Samuel Atkins, Vancouver (CA); Giacomo Domeniconi, Miami, FL (US); Ali Fathi, San Francisco, CA (US)

(73) Assignee: U.S. BANCORP, NATIONAL ASSOCIATION, Minneapolis, MN (US)

( * ) Notice: Subject to any disclaimer, the term of this patent is extended or adjusted under 35 U.S.C. 154(b) by 0 days.

(21) Appl. No.: 19/212,571

(22) Filed: May 19, 2025

(51) Int. Cl.
*G06F 16/3332* (2025.01)
*G06F 16/334* (2025.01)

(52) U.S. Cl.
CPC ........ *G06F 16/3332* (2019.01); *G06F 16/334* (2019.01)

(58) Field of Classification Search
CPC ............................ G06F 16/3332; G06F 16/334
See application file for complete search history.

(56) References Cited

U.S. PATENT DOCUMENTS

| | | | |
|---|---|---|---|
| 2009/0012926 A1* | 1/2009 | Ishikawa | G06F 16/3325 706/47 |
| 2011/0055130 A1* | 3/2011 | Kim | G06F 16/90344 706/18 |
| 2018/0232461 A1* | 8/2018 | Fu | G06F 16/90344 |
| 2024/0211218 A1* | 6/2024 | Shi | G06F 8/36 |
| 2024/0296294 A1* | 9/2024 | Imani | G06F 16/3329 |
| 2025/0045498 A1* | 2/2025 | Lee | G06F 30/27 |

* cited by examiner

*Primary Examiner* — Van H Oberly
*Assistant Examiner* — Ranjit P Doraiswamy
(74) *Attorney, Agent, or Firm* — FOLEY & LARDNER LLP

(57) ABSTRACT

The disclosed embodiments describe a method, system, and computer-readable medium for reducing hallucinations in a large language model in the field of natural language processing involving identifying a plurality of input-output pairs, each input-output pair assigned to a probability and comprising an example input text string and a corresponding output text string, sampling a set of input-output pairs from the plurality of input-output pairs based on the probabilities assigned to the plurality of input-output pairs, generating a list of aggregated input-output pairs from the set of input-output pairs, generating one or more queries by iteratively replacing identified variables within each aggregated input-output pair with a different value from a database, and training, using the one or more queries, a first large language model to convert input queries to machine-readable prompts configured for input into a second large language model.

20 Claims, 6 Drawing Sheets

CONTROLLED PROBABILISTIC SENTENCE SPACE EXPANSION

BACKGROUND

Functional representation tasks generally involve the transformation of unstructured textual input into a structured data format, such as JavaScript Object Notation (JSON), extensible Markup Language (XML), or YAML Ain't Markup Language (YAML). The specific structured format utilized may vary depending on the nature of the task and the requirements of the downstream system. In practical applications, functional representation may require predicting several label types, including continuous values, one-hot encoded vectors, and binary indicators from diverse sentence inputs. When processing unvetted user-generated text, the variability and breadth of possible inputs results in a vast search space. Often in early stages of product development, large volumes of high-quality, task-specific training data are not readily available. Synthetic data can be employed but may fail to adhere to a desired structure and thereby cause the trained model to produce hallucinated output.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 5 illustrates an example machine learning framework that techniques described herein may benefit from.

DETAILED DESCRIPTION

Figure 1:
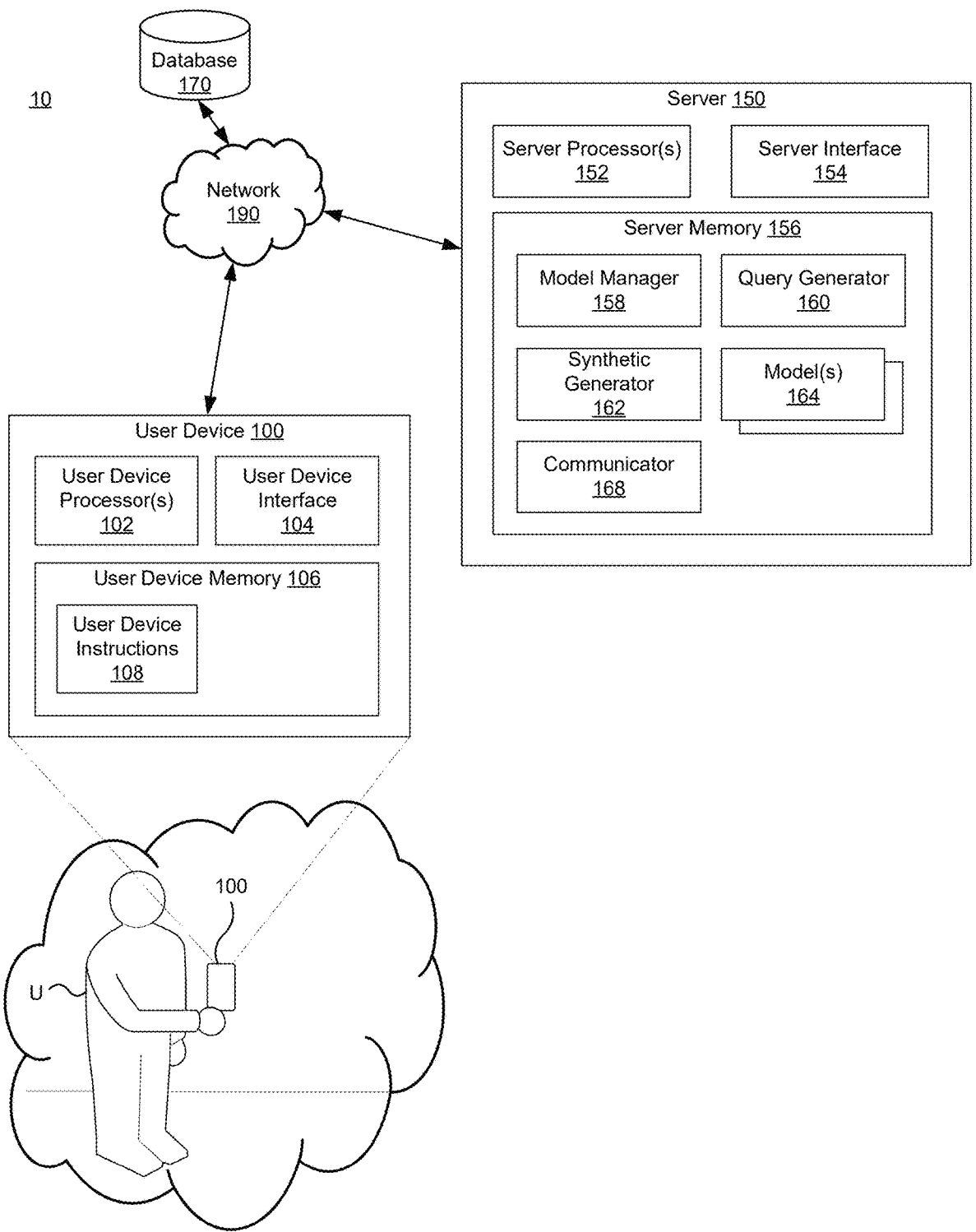
FIG. 1 shows a high-level system for reducing hallucinations in a large language model, according to an example embodiment.

The example embodiments of this invention involve methods, systems, and computer program products for reducing hallucinations in a large language model. Samples are generated and used to train models that convert textual input to structured formats for downstream tasks, such as generating a visual representation of a data structure obtained from a structured format query.

Functional representation is a branch of text analysis in which data are represented as sentence-label pairs. The sentences can be transformed into tokens, and models can utilize these tokens to predict a label. The label can have various forms depending on the context. Approaches to functional representation tasks include tuned transformer models trained to predict structured text that captures the underlying label of input sentences, sentence embedding models to map sentence input to high-dimensional embedding vectors and predict labels associated with each sentence, full-view encoder-predictor models to encode the input into a higher dimensional feature space and transform the feature space into a label prediction, and Named-Entity Recognition (NER), in which labels are explicitly mentioned in the input sentence and models can assign labels to individual words or phrases.

Such approaches to functional representation tasks rely on datasets that adequately capture the possible form, grammar, and vocabulary of the input sentences. However, such datasets are often scarce or imbalanced—especially in emerging or specialized application areas—leading to poor generalization and reduced model performance. Further, labels associated with the input sentences do not cover a large enough portion of the possible combinations of data labels.

Labeled text data can be augmented by methods such as manual or semi-supervised data generation and labelling by domain experts. This process, however, is time-consuming, expensive, and error prone. Other methods include rudimentary data augmentation techniques such as synonym substitution, back-translation, word shuffling, and paraphrase generation. While effective at generating diversity in input sentences, these methods lack the ability to provide user control over the preferred forms of input sentences. Careful implementations may be used to generate augmented training data while preserving the underlying meaning of input sentences.

A computer implementing the systems and methods described here can overcome the aforementioned technical deficiencies. To do so, for example, the computer can identify a plurality of input-output pairs. Each input-output pair can be assigned to a probability and include an example input text string and a corresponding output text string. Each example input text string and corresponding output text of an input-output pair can include a matching variable (e.g., the same variable in the input text string as in the output text string of the input-output pair). For example, for the input sentence "Get the first 100 rows from the product table," an input-output pair can include the input text string "%from% the %t table" and the output text string "table: %t" to form the pair ("% from% the %t table": "table: %t"). The pair can be represented by a data structure, including but not limited to a string, tuple, or list.

The computer can sample a set of input-output pairs from the plurality of input-output pairs based on the probabilities assigned to the plurality of input-output pairs (e.g., weighted random sampling). In doing so, the computer can generate a list (e.g., array, string, tuple) of aggregated input-output pairs from the set of input-output pairs. The computer can do so by concatenating each of the example input text strings of the set of input-output pairs in a plurality of orders (e.g., generating a list for every permutation of the sampled set of input-output pair) and concatenating each of the corresponding output text strings in orders corresponding to the orders of the concatenated example input text strings.

For example, for the sampled input-output pairs:
1) "input1": {"output1"},
2) "input2": {"output2"}, and
3) "input3": {"output3"}, a list of aggregated input-output pairs can follow the orderings of ("input3 input1 input2": {output3 output1 output2}),
("input1 input2 input3": {output1 output2 output3}),
("input2 input3 input1": {output2 output3 output1}), etc.

The computer can, for each aggregated input-output pair of the list of aggregated input-output pairs, generate one or more queries by identifying each variable (e.g., %a% and %yr%) included in the aggregated input-output pair, retrieve one or more values for each identified variable from a database, and iteratively replace each identified variable within the aggregated input-output pair with a different value of the retrieved one or more values (e.g., "10 years" and "AAPL") for the identified variable to generate a different query of the one or more queries.

The computer can train, using the one or more queries for each aggregated input-output pair, a first large language model (LLM) to convert input queries to machine-readable prompts configured for input into a second LLM. For example, the first LLM can be executed to produce machine-readable prompts from natural language input while maintaining the meaning and structure of the natural language input with minimal hallucinated output, such as by reducing the search space for the first LLM.

By processing symbolized samples indicating a target form of input data, the technology described herein can target areas of the input and output search space such that the model can be trained using data in a limited search space of realistic real-world examples. The systems and methods described herein provide increased data generation speed, user control over the input sentence space and label space for functional representation, and the ability to update training data with minimal adjustments to the processing pipeline. Models trained on data generated using the systems and methods described herein are capable of accurately converting text strings into structured formats for input into another computer model (e.g., another LLM), while reducing the occurrence of model hallucinations given a reduced search space and, in turn, enhancing the reliability of resulting downstream tasks.

FIG. 1 shows a high-level system 10. The high-level system 10 can be used for the training, use, and deployment of artificial intelligence models, including those that convert a textual input to a structured format for downstream tasks, according to an example embodiment. The system 10 includes a user device 100 and a server 150, each of which is connected to a network 190.

The user device 100 is a device used by a user U that can be used as part of processes described herein. The user device 100 can include one or more aspects described elsewhere herein such as in reference to the system 10 of FIG. 1. In many examples, the user device 100 is a personal computing device, such as a smart phone, tablet, laptop computer, or desktop computer. But the user device 100 need not be so limited and may instead encompass other devices used by a user as part of processes described herein. In the illustrated example, the user device 100 can include one or more user device processors 102, one or more user device interfaces 104, and user device memory 106, among other components.

The one or more user device processors 102 are one or more components of the user device 100 that execute instructions, such as instructions that obtain data, process the data, and provide output based on the processing. The one or more user device processors 102 can include one or more aspects described below in relation to the one or more processors 412 of FIG. 4.

The one or more user device interfaces 104 are one or more components of the user device 100 that facilitate receiving input from and providing output to something external to the user device 100. For example, the user device 100 can be used to receive an input query from a user (e.g., user U) and provide the query as output to a network in communication with one or more servers. The one or more user device interfaces 104 can include one or more aspects described below in relation to the one or more interfaces 418 of FIG. 4.

The user device memory 106 is a collection of one or more components of the user device 100 configured to store instructions and data for later retrieval and use. The user device memory 106 can include one or more aspects described below in relation to the memory 414 of FIG. 4. As illustrated, the user device memory 106 stores user device instructions 108 and the user device instructions 110.

The user device instructions 108 are a set of instructions that, when executed by one or more of the one or more user device processors 102, cause the one or more user device processors 102 to perform an operation described herein. In examples, the user device instructions 108 can be those of a mobile application (e.g., that may be obtained from a mobile application store, such as the APPLE APP STORE or the GOOGLE PLAY STORE). The mobile application can provide a user interface for receiving user input from a user and acting in response thereto. The user interface can further provide output to the user. In some examples, the client instructions 108 are instructions that cause a web browser of the user device 100 to render a web page associated with a process described herein. The web page may present information to the user and be configured to receive input from the user and take actions in response thereto.

The server 150 is a server device that functions as part of one or more processes described herein. In the illustrated example, the server 150 includes one or more server processors 152, one or more server interfaces 154, and server memory 156, among other components.

The one or more server processors 152 are one or more components of the server 150 that execute instructions, such as instructions that obtain data, process the data, and provide output based on the processing. The one or more server processors 152 can include one or more aspects described below in relation to the one or more processors 412 of FIG. 4.

The one or more server interfaces 154 are one or more components of the server 150 that facilitate receiving input from and providing output to something external to the server 150. The one or more server interfaces 154 can include one or more aspects described below in relation to the one or more interfaces 418 of FIG. 4.

The server memory 156 is a collection of one or more components of the server 150 configured to store instructions and data for later retrieval and use. The server memory 156 can include one or more aspects described below in relation to the memory 414 of FIG. 4. The server memory 156 can store a model manager 158. The server memory 156 also can store a query generator 160. The server memory 156 also can store instructions that cause the server processors 152 to operate as a synthetic generator 162 configured to generate a training dataset for training a model (e.g., query generator 160). Synthetic generator 162 is also referred to as a dataset generator.

Synthetic generator 162 may communicate with one or more models 164 via a communicator 168. The communicator 168 can be configured to communicate directly with user device 100. For example, if the dataset size for training query generator 160 is below a certain threshold or the query generator 160 performs poorly based on user feedback from user device 100, this indicates the dataset may be insufficient. The communicator 168 can communicate to the server 150 that the synthetic generator 162 is to generate and ensure an adequate amount of training examples for the query generator 160.

The model manager 158 can include instructions that, when executed by the one or more server processors 152, cause the one or more server processors 152 to perform one or more operations described elsewhere herein, such as training and executing machine learning models, such as query generator 160 and model 164. For example, the model manager 158 can coordinate training of query generator 160 using a generated set of data from synthetic generator 162. The model manager 158 can coordinate an execution of the query generator 160 to generate a machine-readable prompt from a natural language query input. The model manager 158 can coordinate a model 164 receiving, as input, the output from the query generator 160. The model manager 158 can dynamically select and invoke specific models 164 based on task parameters, input characteristics, or domain-specific requirements. For example, the model manager 158 can select a model 164 configured to convert a machine-readable prompt to structured query language (SQL). The model manager 158 can monitor model performance over time and initiate retraining and/or fine-tuning procedures to maintain or improve model accuracy. The model manager 158 can allocate computational resources efficiently across models to optimize system performance.

The network 190 is a set of devices that facilitate communication from a sender to a destination, such as by implementing communication protocols. Example networks 190 include local area networks, wide area networks, intranets, or the Internet. The network 190 can support wired and wireless communication technologies and can enable the transmission of data in various formats, including structured data, unstructured text, and model outputs.

The system 10 also can include a database 170 in communication via network 190. In an example implementation, user device 120 can query database 170 using queries generated according to the embodiments described herein. Also, in some embodiments, database 170 can be incorporated into server 150. In some examples, database 170 can include a relational database such as MySQL, PostgreSQL, or Oracle. In other examples, the database 170 can include a document-based NoSQL database such as MongoDB or a key-value store such as Redis.

Figure 4:
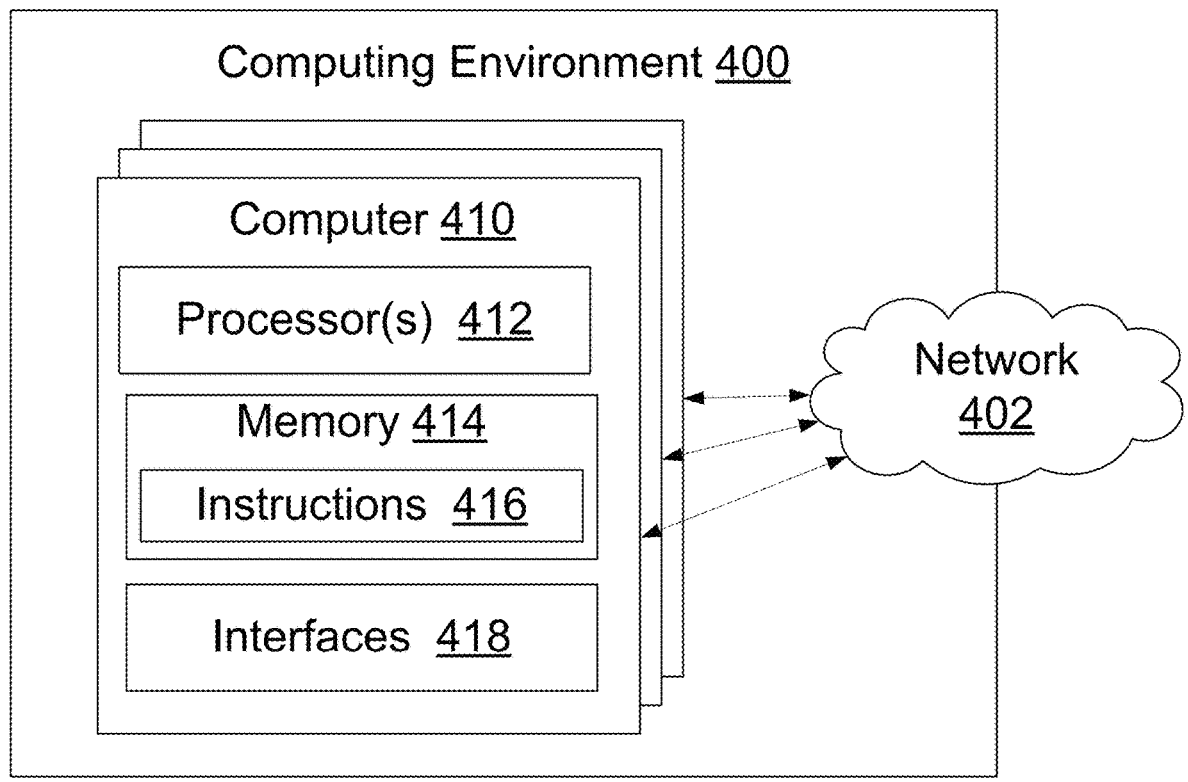
FIG. 4 discloses a computing environment in which aspects of the present disclosure may be implemented.

Referring to both FIG. 1 and FIG. 4, in some embodiments, user device memory 106, server memory 156, and memory 414 are non-transitory memory.

Figure 2A:
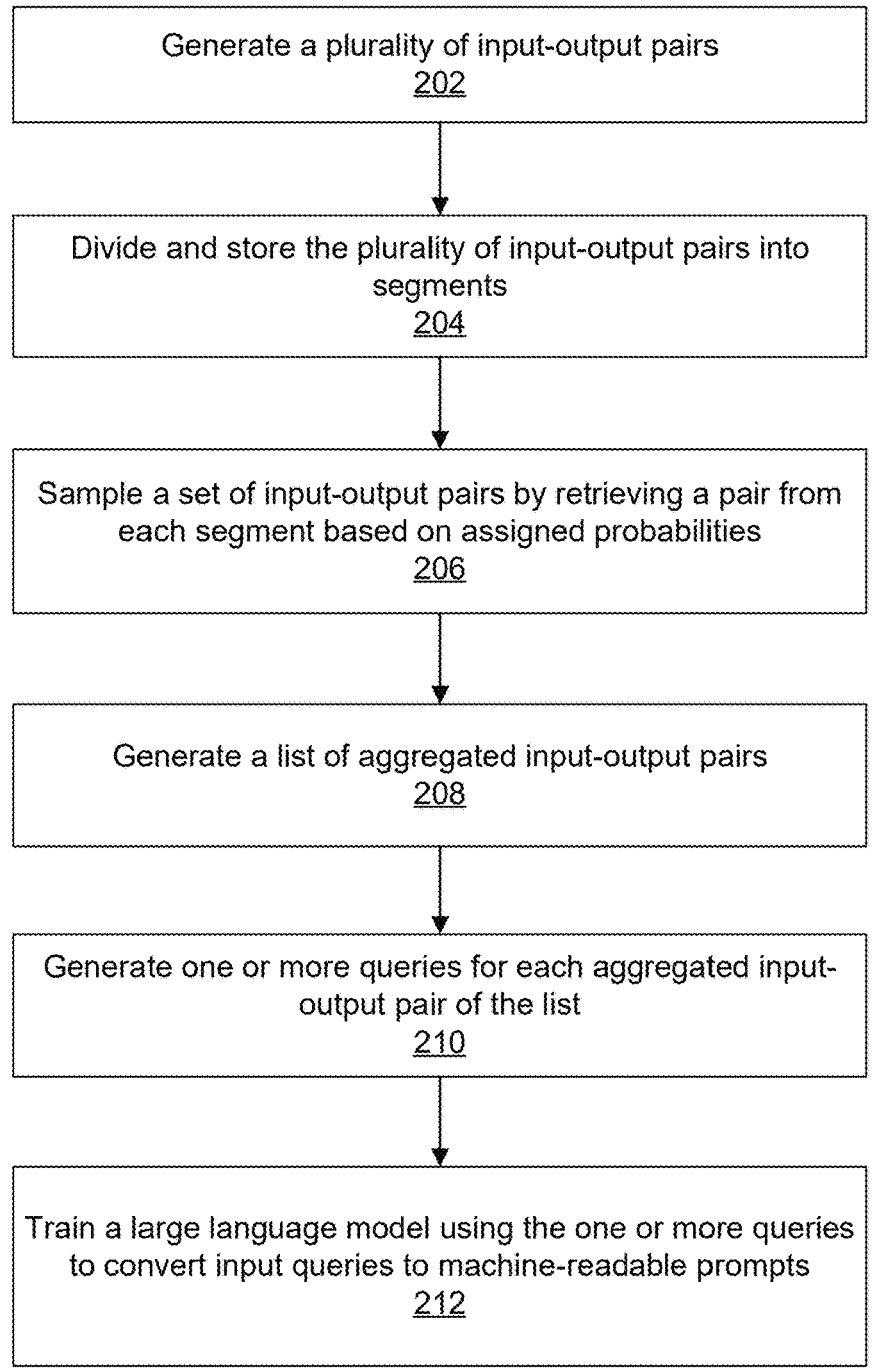
FIG. 2A illustrates an example flowchart of a process for generating training data for training a large language model, in accordance with an implementation.

FIG. 2A illustrates a dataset generation process 200 for generating a training dataset for training a model, according to an example embodiment. The synthetic generator 162 of server 150 (FIG. 1) can operate to perform the data generation process 200 to expand a small set of known input samples, simulating a more extensive training dataset.

A generation operation 202 can include generating a plurality of input-output pairs from one or more input sentences by fragmenting the one or more sentences. In an example input-output pair, the input can be a symbolized text string representation of a fragment of the sentence. The input can include at least one variable. The output can be a symbolized text string representation of a key-value pair in which the key includes a label associated with the fragment, and the value includes at least one matching variable to the variable of the input text string. For example, an input sentence can be "Get the first 100 rows from the product table." Within each sentence, certain fragments can constrain the label. In the above example, the phrase "the product table" constrains the table label to be the "product" table and the phrase "first 100 rows" constrains the number of rows to 100 and the start date to the earliest start date in the table.

The operation 202 can be performed automatically by a computer. For example, the computer can automatically fragment each of the input-output pairs, including an example input text string and a corresponding output text string. An LLM of models 164 of server 150 (FIG. 1) can operate to perform the fragmenting. For example, the LLM can receive, as input, a sentence "Get the first 100 rows from the product table." The LLM can fragment the sentence into the fragments, "Get the first 100 rows", "from the product table" based on the subject matter of the sentence such that the fragments include different subject matter from each other. In the example, the fragment, "Get the first 100 rows" indicates the rows to include, and the fragment "from the product table" indicates the table to search.

Using the example input sentence, "Get the first 100 rows from the product table," a plurality of input-output pairs can include:

| input:output |
|---|
| "%with% %t": "table: %t" |
| "%from% the %t table": "table: %t" |
| "%from% %t": "table: %t" |
| "%max% %n %rows%": "rows: %n" |
| "%n %rows%": "rows: %n" |
| "for %products% %1, %2, %3": "products: [%], %2, %3]" |
| "consider %1": "products: [%1]" | where "%n" is an example variable representing a number of rows.

An operation 204 can include dividing and storing the plurality of input-output pairs into pair groupings based on the output for each of the input-output pairs. In an example input-output pair (e.g., "%with%%t": "table: %t"), the output can be a symbolized text string representation of a key-value pair (e.g., "table: %t"). The key can include a label (e.g., "table") associated with the fragment and the value can include at least one matching variable to the variable of the input text string (e.g., "%t").

The operation 204 can include determining which pair grouping the input-output pair belongs to by identifying the label of the output of the input-output pair. The operation 204 can include ignoring the one or more variables of the output in the determination of the pair grouping. For example, the operation 204 can include dividing and storing the plurality of input-output pairs into pair groupings in which a first pair grouping includes input-output pairs associated with the same first label (e.g., "table") and a second pair grouping includes input-output pairs associated with the same second label (e.g., "rows"). The input-output pairs can be stored in memory as text, numbers, or one-hot encoded vectors.

Following the above example, the operation can include storing the following input-output pairs for each of the labels "[The] table," "[The number of] rows," and "[The] products [to include]" such as:

| The table |
|---|
| "%with% %t": "table: %t" |
| "%from% the %t table": "table: %t" |
| "%from% %t": "table: %t" |

| The number of rows |
|---|
| "%max% %n %rows%": "rows: %n" |
| "%n %rows%": "rows: %n" |

| The products to include |
| --- |
| "for %products% %1, %2, %3": "products: [%1, %2, %3]"<br>"consider %1": "products: [%1]" |

The operation 204 can include assigning a probability to each input-output pair of each pair grouping. Probabilities can be assigned such that the sum of the probabilities within each pair grouping is equal to 1. Each probability can be assigned according to the likelihood that the input of the input-output pair will appear as a user-generated query. For example, for the label "The table," a higher probability may be assigned to the input-output pair with the input "%from% the %t table" than an input-output pair with a less likely or erroneous variant, such as ""%frm% the %t table."

The operation 204 can be performed automatically by a computer. For example, the computer can automatically assign the probabilities to each input-output pair of the plurality of input-output pairs. The probabilities can be assigned such that the probability across all input-output pairs in a particular pair grouping sums to one or another defined value. The computer system can determine each probability based on the estimated likelihood that the input portion of the corresponding input-output pair will occur as a user-generated query. This estimated likelihood can be determined according to a predetermined configuration, which may include statistical models (e.g., models 164 of FIG. 1) trained on historical query data. The computer can dynamically adjust the estimated likelihood based on user interaction data or user-provided feedback. For instance, if a user (e.g., user U of FIG. 1) repeatedly confirms an input-output pair during query processing, the associated likelihood may be increased to reflect its relevance or correctness. Conversely, likelihood values may be decreased for inputs that are consistently ignored or flagged as incorrect. For a label such as "The table," the system may assign a higher probability to an input-output pair with the input string "%from% the %t table" compared to a pair with a less likely or erroneous variant, such as "%frm% the %t table."

A sampling operation 206 can include retrieving a pair from each pair grouping based on the assigned probabilities to obtain a set of input-output pairs. Following the above example pair groupings, the operation 206 can include selecting an input-output pair from "The table," selecting an input-output pair from "The number of rows," and selecting an input-output pair from "The products to include." The probability distribution of each pair grouping can affect the input-output pair that is selected. For example, if the input "%from% the %t table" has a higher assigned probability than the misspelled version ""%frm% the %t table," then there is a greater likelihood that "%from% the %t table" will be sampled.

In an example implementation of the sampling operation 206, there is a non-zero probability that an empty (e.g., " ": { }) input-output pair is retrieved from a pair grouping. In this example implementation, using the example pair groupings above, the empty input-output pair of the pair grouping "The products to include" can be assigned a non-zero probability such that a resulting example sample can include a retrieved input-output pair from "The table" and from "The number of rows," but not from "The products to include."

An example sampled set of input-output pairs can include: ("%max% %n %rows%": "rows: %n"), ("consider %1": "products: [%1]"), and ("%from% %t": "table: %t").

An operation 208 can include generating a list of aggregated input-output pairs. This can include concatenating each of the input text strings of the set of input-output pairs sampled at the operation 206. The input text strings can be concatenated in a first order of a plurality of orders. The operation 208 can include concatenating each of the output text strings of the set of input-output pairs. The output text strings can be concatenated in the first order of the plurality of orders such that the relative position of the output text string in the concatenation of the output text strings corresponds to the relative position of the corresponding input text string in the concatenation of the input text strings. An aggregated input-output pair can be formed with the input of the aggregated pair being the concatenation of the input text strings and the output of the aggregated pair being the concatenation of the output text strings.

The operation 208 can include prepending each input of the aggregated input-output pairs with a prefix term from a database (e.g., database 170 of FIG. 1), such as "Query," "Find," or " " and appending each generated query with a suffix from the database, such as "." or "now."

The operation 208 can include inserting one or more connectives from the database into each input of the aggregated input-output pairs. The connectives can include conjunctions such as "and" and "with." The connectives can include punctuation and symbols such as "," and "&." The operation 208 can include inserting the one or more connectives in between each input text string in the concatenated input string.

The operation 208 can include iteratively concatenating the input text strings of the set of input-output pairs and concatenating the output text strings of the set of input-output pairs according to each of the remaining orders of the plurality of orders to generate a list of aggregated input-output pairs.

Following the above example, the list of aggregated input-output pairs can include: ("Find %max% %n %rows% and consider %1 %from% %t now": {"rows: %n", "products: [%1]", "table: %t"}) and ("%from% %t consider %1 %max% %n %rows%": {"table: %t", "products: [%1]", "rows: %n"}).

A query generation operation 210 can include generating one or more queries for each aggregated input-output pair of the list of aggregated input-output pairs generated at operation 208. For each aggregated input-output pair, the operation 210 can include generating the one or more queries by identifying each variable included in the aggregated input-output pair. The operation 210 can include retrieving one or more values for each identified variable from a database and replacing each identified variable within the aggregated input-output pair with the one or more corresponding values.

In some examples, an aggregated input-output pair can include: ("%max% %n %rows% consider %1 %from% %t": {"rows: %n", "products: [%1]", "table: %t"}). The database can include all words synonymous to the variable "%max%" including "max," "up to," and "no more than." The database can include a defined range of integers that can replace the variable "%n" such as 1, 2, 3, . . . , 10. The database can include all of the possible ways to say "rows" such as "rows," "elements," and "entries." The database can include the possible tables "%t" that a user may query from, such as the "products" table. The database can include the entries of the corresponding table, such as "product A" for the "products" table. In this example, the query can be generated as follows: ("up to 25 entries, consider product A from products": {"rows: 25", "products: [product A]", "table: products"}).

The operation 210 can include generating a plurality of queries and corresponding labels. The operation 210 can include iteratively replacing each identified variable within the aggregated input-output pair with a different value of the retrieved one or more values for the identified variable to generate a different query and corresponding labels of the plurality of queries and corresponding labels.

Following the above example, the following query-label pairs can be generated: ("up to 25 entries, consider product A from products.": {"rows: 25", "products: [product A]", "table: products"}), ("Query up to 20 rows, consider product A from products": {"rows: 20", "products: [product A]", "table: products"}), and ("Find up to 10 elements, consider product A and product B from products now": {"rows: 10", "products: [product A, product B]", "table: products"}).

An augmented labeled dataset D' can be defined as the aggregation of the generated queries Q' and their corresponding labeled versions T'. Here, Q' represents the set of N revised queries, denoted as {q'1, q'2, . . . , q'N}. Labeled synthetic dataset T' represents the output, which is the labeled version of the revised queries. The expanded labeled dataset D' is represented as $D'=\{(q_i, t_i) \in Q', T'\}$, where each $(q_i, t_i)$ pair signifies a revised version of an input query along with its corresponding labeled version. This augmented dataset D' can serve as a resource for training and evaluating models in query generation tasks.

A training operation 212 can include training a large language model (LLM), such as query generator 160 of server 150 (FIG. 1) using the expanded labeled dataset, including the one or more generated queries and corresponding labels. The model manager 158 of server 150 can operate to perform the training of the LLM. During training, the model's parameters can be iteratively updated using the augmented labeled dataset through loss minimization techniques such as backpropagation and gradient descent. For example, the model can process each input query of the input-output pair and generate a predicted output label. The model can determine a loss between the predicted output label and the augmented labeled dataset output label using a loss function (e.g., cross-entropy loss). Using backpropagation, for example, the gradients of the loss with respect to the model parameters can be computed and propagated backward through the network. The gradients can be used to update the model's parameters via gradient descent or a variant thereof, with the goal of minimizing the overall loss across the augmented labeled dataset. Training the LLM on the augmented labeled dataset enables the model to learn more accurate associations between input patterns and intended outputs, thereby improving generalization to various query tasks and reducing the occurrence of hallucinations. The LLM can be trained to generate one or more machine-readable prompts in response to receiving one or more natural language queries. The trained LLM can be executed, for example, to produce machine-readable prompts from natural language input while maintaining the meaning and structure of the natural language input with minimized hallucinated output. By increasing the model's exposure to grounded, high-quality examples and diverse query formats, the likelihood of the model generating incorrect or semantically incoherent responses in downstream applications can be significantly reduced.

Figure 2B:
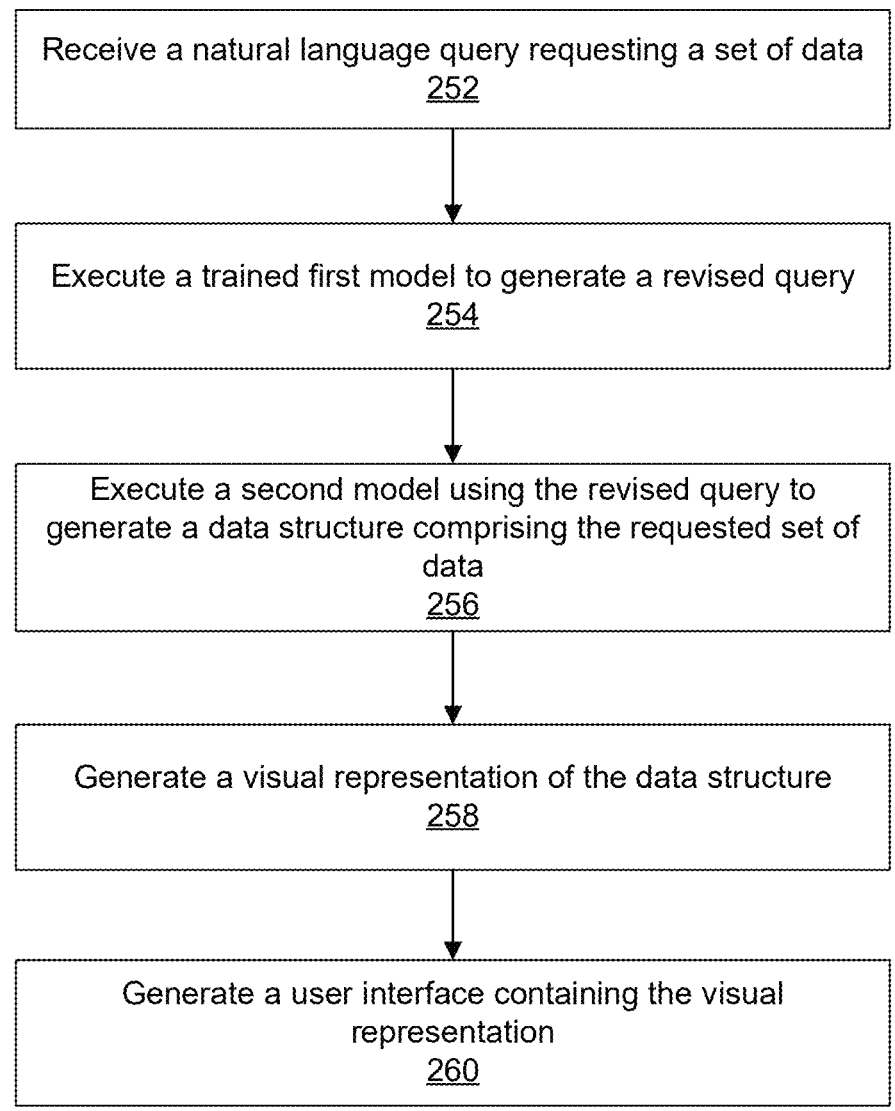
FIG. 2B illustrates an example flowchart of a process for executing a trained LLM, in accordance with an implementation.

FIG. 2B illustrates a process 250 for executing a trained LLM to generate a user interface showing a visual representation of queried data. In some embodiments, the model manager 158 of server 150 (FIG. 1) can operate to perform the model execution process 250.

An operation 252 can include receiving a natural language query requesting a set of data, such as a query requested from user U via user device 100 (FIG. 1). The natural language query can serve as the input for a text-to-query conversion task. In some examples, the natural language query is "ABCD swaps, extended from 5-year tenor to 10-year tenor or up to 20-year maturity difference and pick >5."

An operation 254 can include executing a trained first model to generate a machine-readable prompt. Responsive to receiving the natural language query, the operation 254 can include performing an interpretation of the natural language query using the trained first model. In some examples, the trained first model is a LLM trained using the augmented labeled dataset D' according to the embodiments described above in connection with FIG. 2A. In some embodiments, following the interpretation of the natural language query, the operation 254 includes generating a machine-readable prompt that preserves the meaning of the natural language query input. The machine-readable prompt can be formatted in a structured format such as JSON or XML, for example. In an example format, each entity is represented as a key-value pair, where the key is the entity category, and the value is the actual entity extracted from the query. For example:

{'maturity' : [None, 20.0],
'ticker': ['ABCD'],
'tenor': [5, 10],
'pick': 5.0,
'shorten_extend': 'extend'}

The process 250 can include operation 256 for executing a second model using the revised natural language query to generate a data structure comprising the requested set of data. In some examples, the second model is a computer model configured to map data retrieved using the revised natural language query to a data structure, such as according to the embodiments described above in connection with models 164 of FIG. 1. In some examples, the second model is an LLM. In other examples, the second model is a converter. The second model can be configured to convert machine-readable prompts to a query language format that is compatible with a target database, such as SQL. The second model can retrieve requested data from the target database and generate a data structure (e.g., a table, matrix, etc.).

An operation 258 can include generating a visual representation of the data structure. For instance, after generating the data structure containing data (e.g., the requested set of data) retrieved from the target database, the second model can process the data from the data structure to generate a visual representation of the data. In doing so, the second model can generate a visual representation according to a format (e.g., text, graph, image) included in the revised natural language query, for example. For instance, in some cases, the operation 258 can include generating a response including the results or outcome (e.g., the requested set of data) of the query execution as the visual representation, which can then be displayed at the computing device that transmitted the initial natural language query for the set of data.

An operation 260 can include generating a user interface including the visual representation. The operation 260 can include communicating the user interface back to user device 100 of FIG. 1 to be presented (e.g., for presentation) to the user U via the one or more user device interfaces 104 of user device 100.

Figure 3:
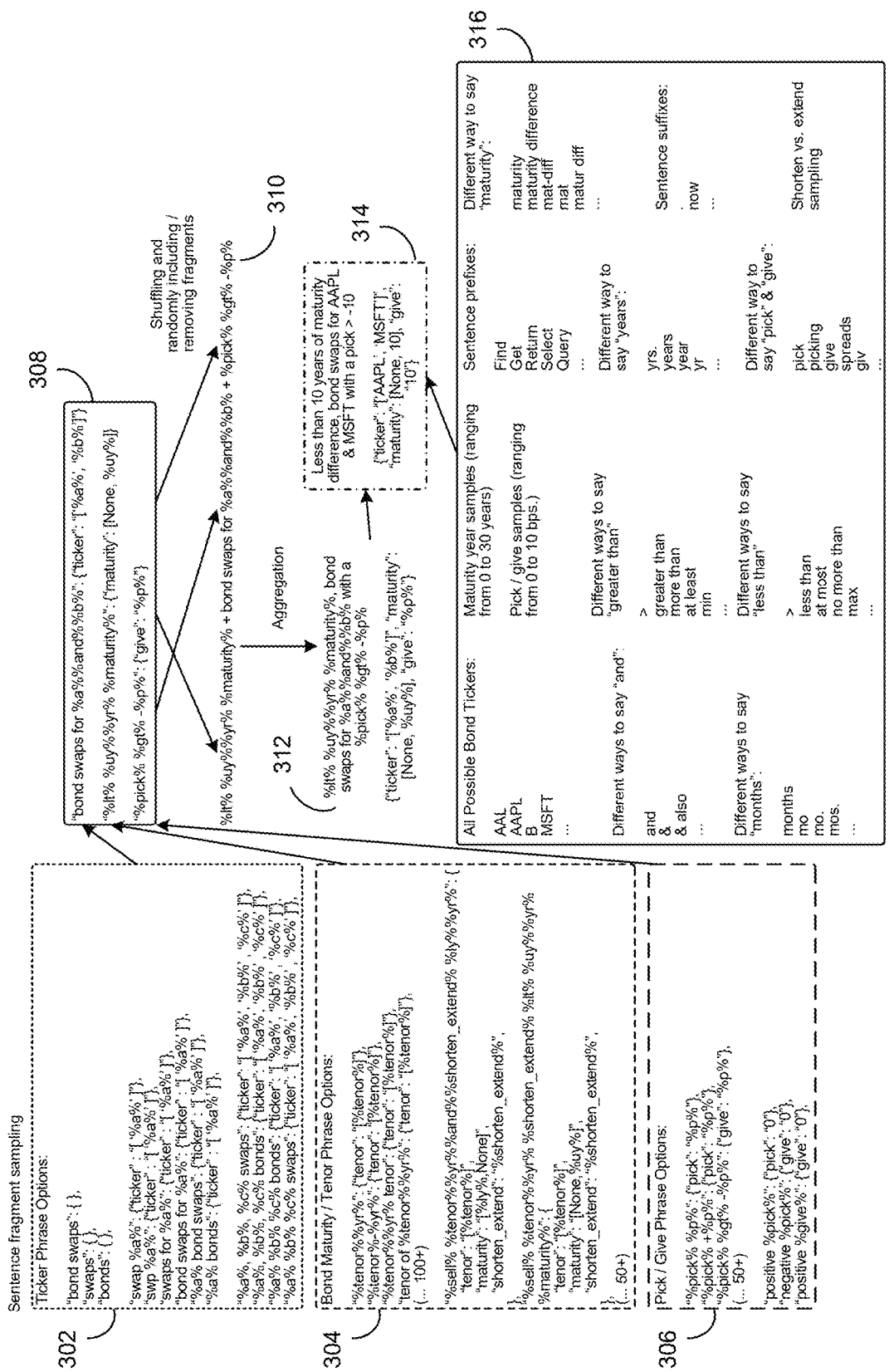
FIG. 3 illustrates an example pipeline of a process for generating training data for training a large language model, in accordance with an implementation.

FIG. 3 illustrates an example system-flow diagram of a process 300 for generating an augmented dataset for training a model to convert unstructured textual data into a structured format, according to an example embodiment. In some embodiments, the synthetic generator 162 of server 150 (FIG. 1) can operate to perform the data generation process 300.

The process 300 can begin a sentence fragment process. A plurality of input-output pairs can be provided as input (e.g., "swap %a%": {"ticker": "['%a%']"} from pair grouping 302, "%tenor%%yr%": {"tenor": "[%tenor %]"} from pair grouping 304, "%pick% %p%": {"pick": "%p%"} from pair grouping 306, etc.). The input can be a text string representation of a symbolized fragment of a query. For example, the query "bond swaps for AAPL" can be fragmented into the input "swap %a%." The input text string can include at least one variable (e.g., "%a%"). The output can be a text string representation of a symbolized label associated with the fragment (e.g., {"ticker": "['%a%']"}, wherein the label is "ticker"). The output text string can include at least one matching variable to the variable of the input text string (e.g., "%a%"). The input-output pairs can be automatically constructed and symbolized by a computer to capture expected fragment forms.

The process 300 can include dividing and storing the plurality of input-output pairs into one or more pair groupings, such as pair groupings 302, 304, 306, according to an associated output label, such as "ticker," "tenor," and "pick," respectively. The pair grouping assigned to an input-output pair can be determined based on the associated output label. For example, input-output pairs associated with the label "pick" can be grouped in the same pair grouping as input-output pairs associated with the label "give" due to an associated context between "pick" and "give." Each pair grouping can comprise a plurality of input-output pairs associated with the same label, for example, the input-output pairs with the label "ticker" of pair grouping 302. The pair groupings can comprise input-output pairs with contextually related labels, for example, the input-output pairs with the label "pick" and the input-output pairs with the label "give" of pair grouping 306.

The process 300 can include assigning a probability to each input-output pair of each pair grouping such that the probabilities within each pair grouping sum to 1. The probability can be assigned according to the likelihood that the input of the input-output pair will be used as a user input. For example, in pair grouping 302, a higher probability can be assigned to the input-output pair "swap %a%": {"ticker": "['%a%']"} than an input-output pair with a misspelled input, such as "swp %a%": {"ticker": "['%a%']"}. The process 300 can include dynamically adjusting probabilities based on user interaction or user-provided feedback to improve output of the model trained on the generated data.

The process 300 can include sampling a set 308 of input-output pairs by retrieving a pair from each pair grouping based on the assigned probabilities to obtain the set of input-output pairs. For example, from each pair grouping 302, 304, and 306, the process 300 can include selecting the input-output pair "bond swaps for %a%%and%%b%": {"ticker": "['%a%', '%b%']"} from pair grouping 302, selecting the input-output pair "%lt% %uy%%yr% %maturity%": {"maturity": [None, %uy%]} from pair grouping 304, and selecting the input-output pair "%pick% %gt%-%p%": {"give": "%p%"} from pair grouping 306 to form the set 308.

In some examples, the set of input-output pairs 308 is sampled using a subset of the pair groupings 302, 304, 306. In these examples, there is a non-zero assigned probability to an empty input-output pair (e.g., " ": { }) in a pair grouping. These examples can include selecting the input-output pair (" ": { }) from pair grouping 302, selecting the input-output pair "%lt% %uy%%yr% %maturity%": {"maturity": [None, %uy%]} from pair grouping 304 and selecting the input-output pair "%pick% %gt%-%p%": {"give": "%p%"} from pair grouping 306.

The process 300 can include generating an aggregated input-output pair. This can include concatenating each of the input text strings of the set of input-output pairs to form aggregated input 310. The input text strings can be concatenated in a first order of a plurality of orders. For example, the aggregated input 310 can be generated according to the order of the input text string sampled from pair grouping 304, followed by the input text string sampled from pair grouping 302, followed by the input text string sampled from pair grouping 306. The input text strings can be shuffled according to various orders and including various fragments. In some examples, the aggregated input can be generated according to the pair grouping order 306, 302, 304. In other examples, the aggregated input can be generated according to the pair grouping order 306, 304.

The process 300 can include retrieving one or more connectives from database 316 and iteratively inserting each connective of the one or more connectives between each input text string in the aggregated input 310 (e.g., aggregated text string). For example, for the aggregated input 310, "%lt% %uy%%yr% %maturity%+bond swaps for %a%%and%% b%+%pick% %gt%-%p%," the connective "," can be inserted in between the first and second input text string (e.g., replacing the first "+"), and the connective "with a" can be inserted in between the second and third input text string (e.g., replacing the second "+"), resulting in the aggregated input "%lt% %uy%%yr% %maturity%, bond swaps for %a%%and%%b% with a %pick% %gt%-%p%" of aggregated input-output pair 312.

The process 300 can include concatenating each of the output text strings of the set of input-output pairs. The output text strings can be concatenated in the first order of the plurality of orders such that the relative position of the output text string in aggregated output corresponds to the relative position of the corresponding input text string in the concatenation of the input text strings. For example, the aggregated output can be generated according to the order of the output text string sampled from pair grouping 304, followed by the output text string sampled from pair grouping 302, followed by the output text string sampled from pair grouping 306.

The process 300 can include forming an aggregated input-output pair 312 with the aggregated input 310 (e.g., "%lt% %uy%%yr% %maturity%, bond swaps for %a%%and%%b% with a %pick% %gt%-%p%") and the aggregated output corresponding to the first order (e.g., {"ticker": "['%a%', '%b%']", "maturity": [None, %uy%], "give": "%p%"}). The process 300 can include generating a list of aggregated input-output pairs according to each order of a plurality of orders. This can include shuffling the aggregated input according to different orders and shuffling the outputs of the aggravated output according to corresponding orders of inputs to form a plurality of aggregated input output pairs.

For example, for the sampled input-output pairs:
1) "bond swaps for %a%% and %%b%": {"ticker": "['%a%', '%b%']"},
2) "%lt% %uy%%yr% %maturity%": {"maturity": [None, %uy%]}, and
3) "%pick% %gt%-%p%": {"give": "%p%"}, a list of aggregated input-output pairs can include: ("%pick% %gt%-%p% bond swaps for %a%% and %%b% %lt% %uy%%yr% %maturity%": {"give": "%p%", "ticker": "['%a%', '%b%']", "maturity": [None, %uy%]}), ("bond swaps for %a%% and %%b% %lt% %uy%%yr% %maturity% %pick% %gt%-%p%": {"ticker": "['%a%', '%b%']", "maturity": [None, %uy%], "give": "%p%"}), ("%lt% %uy%%yr% %maturity% %pick% %gt%-%p% bond swaps for %a%% and %%b%": {maturity ": [None, %uy%], "give": "%p%", "ticker": "['%a%', '%b%']"}), etc. The process 300 can include generating permutations over selected subsets or the entirety of the set 308 to construct the aggregated input-output pair.

The process 300 can include generating one or more queries 314 for each aggregated input-output pair of the list of aggregated input-output pairs. For each aggregated input-output pair, the process 300 can include generating the one or more queries by identifying each variable included in the aggregated input-output pair. The process 300 can include retrieving one or more values for each identified variable from a database, such as database 316, and replacing each identified variable within the aggregated input-output pair with the one or more corresponding values. In some examples, the process 300 can include substituting possible bond tickers "AAPL" and "MSFT" from database 316 and into the aggregated input-output pair for variables "%a%" and "%b%", respectively. The process 300 can include iteratively replacing each identified variable within the aggregated input-output pair with a different value of the retrieved one or more values for the identified variable to generate a different query of the one or more queries. In some examples, the process 300 can include substituting a possible bond tickers "AAL" and "B" from database 316 and into the aggregated input-output pair for variables "%a%" and "%b%", respectively.

The process 300 can include prepending each generated query input with a prefix term from the database 316, such as "Query," "Find," or " ", and appending each generated query input with a suffix from the database, such as "." or "now." For example, the generated query can include input-output: "Find less than 10 years of maturity difference, bond swaps for AAPL & MSFT with a pick >-10.": {"ticker": "['AAPL', 'MSFT']", "maturity": [None, 10], "give": "10"}.

The process 300 can include validating the one or more generated queries according to a predetermined configuration. Based on validating the one or more queries, the process 300 can include adding a new input-output pair to the plurality of input-output pairs. The process 300 can include adjusting the probability of each input-output pair of the plurality of input-output pairs, including the new input-output pair. The process 300 can include sampling a second set of input-output pairs from the plurality of input-output pairs based on the probabilities assigned to the plurality of input-output pairs. The process 300 can include generating a second list of aggregated input-output pairs from the second set of input-output pairs.

The process 300 can include training a first large language model (LLM), such as query generator 160 of server 150 (FIG. 1) using the expanded labeled dataset, including the one or more generated queries and corresponding labels.

The process 300 can include receiving a new input-output pair after training the LLM. In some examples, the new input-output pair represents a new query format. The process 300 can include adding the new input-output pair to the plurality of input-output pairs. The process 300 can include adjusting the probability of each input-output pair of the plurality of input-output pairs, including the new input-output pair. The process 300 can include sampling a second set of input-output pairs from the plurality of input-output pairs based on the probabilities assigned the plurality of input-output pairs. The process 300 can include generating a second list of aggregated input-output pairs from the second set of input-output pairs. The process 300 can include retraining the LLM using the one or more queries for each aggregated input-output pair of the second list of aggregated input-output pairs.

The first LLM can be executed to generate one or more machine-readable prompts configured for input into a second large language model (e.g., model 164 of server 150) in response to receiving one or more natural language queries. For example, the first LLM can convert the natural language query into a machine-readable format (e.g., JSON). The second LLM can convert the machine-readable format into a query-language format appropriate to retrieve data from a desired location, (e.g., SQL, PostgreSQL).

In some embodiments, the techniques described herein relate to a system for reducing hallucinations in a large language model. The system can include one or more processors configured by computer-readable media to identify a plurality of input-output pairs, each input-output pair assigned to a probability and including an example input text string and a corresponding output text string, the example input text string and the corresponding output text of an input-output pair each including a matching variable. The one or more processors can be configured to sample a set of input-output pairs from the plurality of input-output pairs based on the probabilities assigned to the plurality of input-output pairs. The one or more processors can be configured to generate a list of aggregated input-output pairs from the set of input-output pairs by concatenating each of the example input text strings of the set of input-output pairs in a plurality of orders and concatenating each of the corresponding output text strings in orders corresponding to the orders of the concatenated example input text strings. The one or more processors can be configured to, for each aggregated input-output pair of the list of aggregated input-output pairs, generate one or more queries by identifying each variable included in the aggregated input-output pair, retrieving one or more values for each identified variable from a database, and iteratively replacing each identified variable within the aggregated input-output pair with a different value of the retrieved one or more values for the identified variable to generate a different query of the one or more queries. The one or more processors can be configured to train, using the one or more queries for each aggregated input-output pair, a first large language model to convert input queries to machine-readable prompts configured for input into a second large language model.

In some embodiments, the techniques described herein relate to a system in which the one or more processors are further configured to concatenate each of the example input text strings by retrieving one or more connectives from the database and iteratively inserting each connective of the one or more connectives between each variable in the input text string.

In some embodiments, the techniques described herein relate to a system in which the one or more processors are further configured to sample the set of input-output pairs by dividing the plurality of input-output pairs into one or more pair groupings and selecting an input-output pair from each of the one or more pair groupings to obtain the set of input-output pairs.

In some embodiments, the techniques described herein relate to a system, wherein the probabilities assigned to the plurality of input-output pairs indicate how likely the input-output pair is to appear as a user-generated query.

In some embodiments, the techniques described herein relate to a method. The method can include identifying a plurality of input-output pairs, each input-output pair assigned to a probability and including an example input text string and a corresponding output text string. The method can include sampling a set of input-output pairs from the plurality of input-output pairs based on the probabilities assigned to the plurality of input-output pairs. The method can include generating a list of aggregated input-output pairs from the set of input-output pairs by concatenating each of the example input text strings of the set of input-output pairs in a plurality of orders and concatenating each of the corresponding output text strings in orders corresponding to the orders of the concatenated example input text strings. The method can include, for each aggregated input-output pair of the list of aggregated input-output pairs, generating one or more queries by retrieving one or more values from a database. The method can include iteratively generating a query based on the aggregated input-output pair and each of the one or more values. The method can include training, using the one or more queries for each aggregated input-output pair, a first large language model to convert input queries to machine-readable prompts configured for input into a computer model.

In some embodiments, the techniques described herein relate to a method in which sampling the set of input-output pairs further includes dividing the plurality of input-output pairs into one or more pair groupings and selecting an input-output pair from each of the one or more pair groupings.

In some embodiments, the techniques described herein relate to a method in which a computer automatically fragments each of the input-output pairs into the example input text string and the corresponding output text string.

In some embodiments, the techniques described herein relate to a method in which the computer automatically assigns the probability to each input-output pair of the plurality of input-output pairs.

In some embodiments, the techniques described herein relate to a method, wherein the example input text string and the corresponding output text string of the input-output pair each include a matching variable.

In some embodiments, the techniques described herein relate to a method, wherein generating the one or more queries further includes identifying each variable included in the aggregated input-output pair, retrieving one or more values for each identified variable from a database, and iteratively replacing each identified variable within the aggregated input-output pair with a different value of the retrieved one or more values for the identified variable to generate a different query of the one or more queries.

In some embodiments, the techniques described herein relate to a method, wherein iteratively generating the query further includes prepending a prefix of a plurality of prefixes to the query and appending a suffix of a plurality of suffixes to the query.

In some embodiments, the techniques described herein relate to a method, wherein concatenating each of the example input text strings further includes retrieving one or more connectives from the database and iteratively inserting each connective of the one or more connectives between each variable in the input text string.

In some embodiments, the techniques described herein relate to a method, wherein training the first language model further includes validating the one or more queries according to a predetermined configuration.

In some embodiments, the techniques described herein relate to a method, further including adding a new input-output pair to the plurality of input-output pairs, adjusting the probability of each input-output pair of the plurality of input-output pairs, sampling a second set of input-output pairs from the plurality of input-output pairs based on the probabilities assigned to the plurality of input-output pairs, generating a second list of aggregated input-output pairs from the second set of input-output pairs, and retraining, using the one or more queries for each aggregated input-output pair of the second list of aggregated input-output pairs, the first large language model to convert input queries to machine-readable prompts configured for input into the computer model.

In some embodiments, the techniques described herein relate to a method, further including receiving a natural language query requesting a set of data, executing the trained first large language model to generate a revised query, executing the computer model using the revised query to generate a data structure including the requested set of data, generating a visual representation of the data structure, and generating a user interface containing the visual representation.

In some embodiments, the techniques described herein relate to non-transitory computer-readable media including instructions that, when executed by one or more processors, cause the one or more processors to identify a plurality of input-output pairs, each input-output pair assigned to a probability and including an example input text string and a corresponding output text string. The media can cause the one or more processors to sample a set of input-output pairs from the plurality of input-output pairs based on the probabilities assigned to the plurality of input-output pairs. The media can cause the one or more processors to generate a list of aggregated input-output pairs from the set of input-output pairs by concatenating each of the example input text strings of the set of input-output pairs in a plurality of orders and concatenating each of the corresponding output text strings in orders corresponding to the orders of the concatenated example input text strings. The media can cause the one or more processors to, for each aggregated input-output pair of the list of aggregated input-output pairs, generate one or more queries by retrieving one or more values from a database. The media can cause the one or more processors to iteratively generate a query based on the aggregated input-output pair and each of the one or more values. The media can cause the one or more processors to train, using the one or more queries for each aggregated input-output pair, a first large language model to convert input queries to machine-readable prompts configured for input into a computer model.

In some embodiments, the techniques described herein relate to non-transitory computer-readable media, wherein instructions causing the one or more processors to sample the set of input-output pairs further includes instructions causing the one or more processors to divide the plurality of input-output pairs into one or more pair groupings and select an input-output pair from each of the one or more pair groupings.

In some embodiments, the techniques described herein relate to non-transitory computer-readable media, wherein the example input text string and the corresponding output text of an input-output pair each include a matching variable.

In some embodiments, the techniques described herein relate to non-transitory computer-readable media, wherein the instructions cause the one or more processors to identify each variable included in the aggregated input-output pair, retrieve one or more values for each identified variable from a database, and iteratively replace each identified variable within the aggregated input-output pair with a different value of the retrieved one or more values for the identified variable to generate a different query of the one or more queries.

In some embodiments, the techniques described herein relate to non-transitory computer-readable media, wherein instructions to iteratively generate the query further include instructions causing the one or more processors to prepend a prefix of a plurality of prefixes to the query and append a suffix of a plurality of suffixes to the query.

Computing Environment

FIG. 4 discloses a computing environment 400 in which aspects of the present disclosure may be implemented. A computing environment 400 is a set of one or more virtual or physical computers 410 that individually or in cooperation achieve tasks, such as implementing one or more aspects described herein. The computers 410 have components that cooperate to cause output based on input. Example computers 410 include desktops, servers, mobile devices (e.g., smart phones and laptops), wearables, virtual reality devices, augmented reality devices, expanded reality devices, spatial computing devices, virtualized devices, other computers, or combinations thereof. In particular example implementations, the computing environment 400 includes at least one physical computer.

The computing environment 400 may specifically be used to implement one or more aspects described herein. In some examples, one or more of the computers 410 may be implemented as a user device, such as mobile device and others of the computers 410 may be used to implement aspects of a machine learning framework useable to train and deploy models exposed to the mobile device or provide other functionality, such as through exposed application programming interfaces.

The computing environment 400 can be arranged in any of a variety of ways. The computers 410 can be local to or remote from other computers 410 of the computing environment 400. The computing environment 400 can include computers 410 arranged according to client-server models, peer-to-peer models, edge computing models, other models, or combinations thereof.

In many examples, the computers 410 are communicatively coupled with devices internal or external to the computing environment 400 via a network 190. The network 190 is a set of devices that facilitate communication from a sender to a destination, such as by implementing communication protocols. Example networks 190 include local area networks, wide area networks, intranets, or the Internet.

In some implementations, computers 410 can be general-purpose computing devices (e.g., consumer computing devices). In some instances, via hardware or software configuration, computers 410 can be special purpose computing devices, such as servers able to practically handle large amounts of client traffic, machine learning devices able to practically train machine learning models, data stores able to practically store and respond to requests for large amounts of data, other special purposes computers, or combinations thereof. The relative differences in capabilities of different kinds of computing devices can result in certain devices specializing in certain tasks. For instance, a machine learning model may be trained on a powerful computing device and then stored on a relatively lower powered device for use.

Many example computers 410 include one or more processors 412, memory 414, and one or more interfaces 418. Such components can be virtual, physical, or combinations thereof.

The one or more processors 412 are components that execute instructions, such as instructions that obtain data, process the data, and provide output based on the processing. The one or more processors 412 often obtain instructions and data stored in the memory 414. The one or more processors 412 can take any of a variety of forms, such as central processing units, graphics processing units, coprocessors, tensor processing units, artificial intelligence accelerators, microcontrollers, microprocessors, application-specific integrated circuits, field programmable gate arrays, other processors, or combinations thereof. In example implementations, the one or more processors 412 include at least one physical processor implemented as an electrical circuit. Example providers of processors 412 include INTEL, AMD, QUALCOMM, TEXAS INSTRUMENTS, and APPLE.

The memory 414 is a collection of components configured to store instructions 416 and data for later retrieval and use. The instructions 416 can, when executed by the one or more processors 412, cause execution of one or more operations that implement aspects described herein. In many examples, the memory 414 is a non-transitory computer readable medium, such as random-access memory, read only memory, cache memory, registers, portable memory (e.g., enclosed drives or optical disks), mass storage devices, hard drives, solid state drives, other kinds of memory, or combinations thereof. In certain circumstances, transitory memory 414 can store information encoded in transient signals.

The one or more interfaces 418 are components that facilitate receiving input from and providing output to something external to the computer 410, such as visual output components (e.g., displays or lights), audio output components (e.g., speakers), haptic output components (e.g., vibratory components), visual input components (e.g., cameras), auditory input components (e.g., microphones), haptic input components (e.g., touch or vibration sensitive components), motion input components (e.g., mice, gesture controllers, finger trackers, eye trackers, or movement sensors), buttons (e.g., keyboards or mouse buttons), position sensors (e.g., terrestrial or satellite-based position sensors such as those using the Global Positioning System), other input components, or combinations thereof (e.g., a touch sensitive display). The one or more interfaces 418 can include components for sending or receiving data from other computing environments or electronic devices, such as one or more wired connections (e.g., Universal Serial Bus connections, THUNDERBOLT connections, ETHERNET connections, serial ports, or parallel ports) or wireless connections (e.g., via components configured to communicate via radiofrequency signals, such as according to WI-FI, cellular, BLUETOOTH, ZIGBEE, or other protocols). One or more of the one or more interfaces 418 can facilitate connection of the computing environment 400 to a network 190.

The computers 410 can include any of a variety of other components to facilitate performance of operations described herein. Example components include one or more power units (e.g., batteries, capacitors, power harvesters, or power supplies) that provide operational power, one or more busses to provide intra-device communication, one or more cases or housings to encase one or more components, other components, or combinations thereof.

A person of skill in the art, having benefit of this disclosure, may recognize various ways for implementing technology described herein, such as by using any of a variety of programming languages (e.g., a C-family programming language, PYTHON, JAVA, RUST, HASKELL, other languages, or combinations thereof), libraries or packages (e.g., that provide functions for obtaining, processing, and presenting data, such as may be obtained using a package manager like PIP or CONDA), compilers, and interpreters to implement aspects described herein. Example libraries include NLTK (Natural Language Toolkit) by Team NLTK (providing natural language functionality), PYTORCH by META (providing machine learning functionality), NUMPY by the NUMPY Developers (providing mathematical functions), and BOOST by the Boost Community (providing various data structures and functions) among others. Operating systems (e.g., WINDOWS, LINUX, MACOS, IOS, and ANDROID) may provide their own libraries or application programming interfaces useful for implementing aspects described herein, including user interfaces and interacting with hardware or software components. Web applications can also be used, such as those implemented using JAVASCRIPT or another language. A person of skill in the art, with the benefit of the disclosure herein, can use programming tools to assist in the creation of software or hardware to achieve techniques described herein, such as intelligent code completion tools (e.g., INTELLISENSE) and artificial intelligence tools (e.g., GITHUB COPILOT by MICROSOFT or CODE LLAMA by META).

In some examples, large language models can be used to understand natural language, generate natural language, or perform other tasks. Examples of such large language models include CHATGPT by OPENAI, a LLAMA model by META, a CLAUDE model by ANTHROPIC, others, or combinations thereof. Such models can be fine-tuned on relevant data using any of a variety of techniques to improve the accuracy and usefulness of the answers. The models can be run locally on server or client devices or accessed via an application programming interface. Some of those models or services provided by entities responsible for the models may include other features, such as speech-to-text features, text-to-speech, image analysis, research features, and other features, which may also be used as applicable.

Machine Learning Framework

Figure 5:
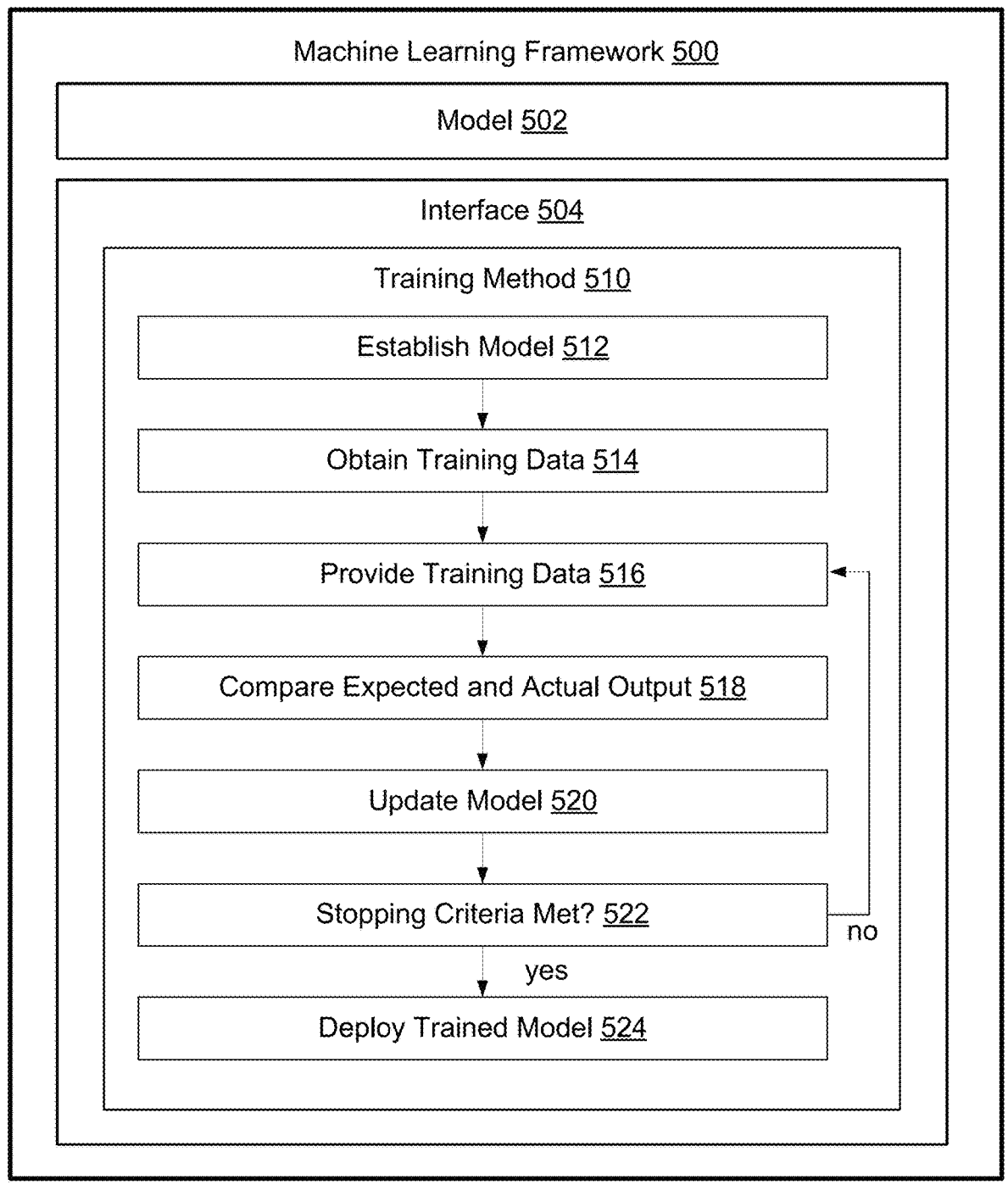

FIG. 5 illustrates an example machine learning framework 500 that techniques described herein may benefit from or improve on. A machine learning framework 500 is a collection of software and data that implements artificial intelligence trained to provide output, such as predictive data, based on input. Examples of artificial intelligence that can be implemented with machine learning way include neural networks (including recurrent neural networks), language models (including so-called "large language models"), generative models, natural language processing models, adversarial networks, decision trees, Markov models, support vector machines, genetic algorithms, others, or combinations thereof. A person of skill in the art having the benefit of this disclosure will understand that these artificial intelligence implementations need not be equivalent to each other and may instead select from among them based on the context in which they will be used. Machine learning frameworks 500 or components thereof are often built or refined from existing frameworks, such as TENSORFLOW by GOOGLE, INC. or PYTORCH by the PYTORCH community.

The machine learning framework 500 can include one or more models 502 that are the structured representation of learning and an interface 504 that supports use of the model 502.

The model 502 can take any of a variety of forms. In many examples, the model 502 includes representations of nodes (e.g., neural network nodes, decision tree nodes, Markov model nodes, other nodes, or combinations thereof) and connections between nodes (e.g., weighted or unweighted unidirectional or bidirectional connections). In certain implementations, the model 502 can include a representation of memory (e.g., providing long short-term memory functionality). Where the set includes more than one model 502, the models 502 can be linked, cooperate, or compete to provide output.

The interface 504 can include software procedures (e.g., defined in a library) that facilitate the use of the model 502, such as by providing a way to establish and interact with the model 502. For instance, the software procedures can include software for receiving input, preparing input for use (e.g., by performing vector embedding, such as using Word2Vec, BERT, or another technique), processing the input with the model 502, providing output, training the model 502, performing inference with the model 502, fine tuning the model 502, other procedures, or combinations thereof.

In an example implementation, interface 504 can be used to facilitate a training method 510 that can include operation 512. Operation 512 includes establishing a model 502, such as initializing a model 502. The establishing can include setting up the model 502 for further use (e.g., by training or fine tuning). The model 502 can be initialized with values. In examples, the model 502 can be pretrained. Operation 514 can follow operation 512. Operation 514 includes obtaining training data. In many examples, the training data includes pairs of input and desired output given the input. In supervised or semi-supervised training, the data can be prelabeled, such as by human or automated labelers. In unsupervised learning the training data can be unlabeled. The training data can include validation data used to validate the trained model 502. Operation 516 can follow operation 514. Operation 516 includes providing a portion of the training data to the model 502. This can include providing the training data in a format usable by the model 502. The framework 500 (e.g., via the interface 504) can cause the model 502 to produce an output based on the input. Operation 518 can follow operation 516. Operation 518 includes comparing the expected output with the actual output. In an example, this can include applying a loss function to determine the difference between expected and actual. This value can be used to determine how training is progressing. Operation 520 can follow operation 518. Operation 520 includes updating the model 502 based on the result of the comparison. This can take any of a variety of forms depending on the nature of the model 502. Where the model 502 includes weights, the weights can be modified to increase the likelihood that the model 502 will produce correct output given an input. Depending on the model 502, backpropagation or other techniques can be used to update the model 502. Operation 522 can follow operation 520. Operation 522 includes determining whether a stopping criterion has been reached, such as based on the output of the loss function (e.g., actual value or change in value over time). In addition, or instead, whether the stopping criterion has been reached can be determined based on a number of training epochs that have occurred or an amount of training data that has been used. In some examples, satisfaction of the stopping criterion can include If the stopping criterion has not been satisfied, the flow of the method can return to operation 514. If the stopping criterion has been satisfied, the flow can move to operation 522. Operation 522 includes deploying the trained model 502 for use in production, such as providing the trained model 502 with real-world input data and produce output data used in a real-world process. The model 502 can be stored in memory 414 of at least one computer 410, or distributed across memories of two or more such computers 410 for production of output data (e.g., predictive data).

Application of Techniques

Techniques herein may be applicable to improving technological processes of a financial institution, such as technological aspects of actions (e.g., resisting fraud, entering loan agreements, transferring financial instruments, or facilitating payments). Although technology may be related to processes performed by a financial institution, unless otherwise explicitly stated, claimed inventions are not directed to fundamental economic principles, fundamental economic practices, commercial interactions, legal interactions, or other patent ineligible subject matter without something significantly more. As used in this disclosure, a random process may include a pseudorandom process that involves the use of one or more algorithms to generate pseudorandom values. A random process may also include a physics-based random process that involves the use of a physical measurement to generate a random value.

Where implementations involve personal or corporate data, that data can be stored in a manner consistent with relevant laws and with a defined privacy policy. In certain circumstances, the data can be decentralized, anonymized, or fuzzed to reduce the amount of accurate private data that is stored or accessible at a particular computer. The data can be stored in accordance with a classification system that reflects the level of sensitivity of the data and that encourages human or computer handlers to treat the data with a commensurate level of care.

Where implementations involve machine learning, machine learning can be used according to a defined machine learning policy. The policy can encourage the training of a machine learning model with a diverse set of training data. Further, the policy can encourage testing for, and correcting undesirable bias embodied in the machine learning model. The machine learning model can further be aligned such that the machine learning model tends to produce output consistent with a predetermined morality. Where machine learning models are used in relation to a process that makes decisions affecting individuals, the machine learning model can be configured to be explainable such that the reasons behind the decision can be known or determinable. The machine learning model can be trained or configured to avoid making decisions based on protected characteristics.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

In some embodiments, the operations described in this disclosure may be implemented in a set of processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on a set of non-transitory, machine-readable media, such as an electronic storage medium. Furthermore, the use of the term "media" may include a single medium or combination of multiple media, such as a first medium and a second medium. A set of non-transitory, machine-readable media storing instructions may include instructions included on a single medium or instructions distributed across multiple media. The processing devices may include one or more devices configured through hardware, firmware, and/or software to be specifically designed for the execution of one or more of the operations of the methods.

It should be noted that the features and limitations described in any one embodiment may be applied to any other embodiment herein, and a flowchart or examples relating to one embodiment may be combined with any other embodiment in a suitable manner, done in different orders, or done in parallel. Furthermore, not all operations of a flowchart need to be performed. In addition, the systems and methods described herein may be performed in real time. It should also be noted that the systems and/or methods described above may be applied to, or used in accordance with, other systems and/or methods.

In some embodiments, the various computer systems and subsystems illustrated in the figures may include one or more computing devices that are programmed to perform the functions described herein. The computing devices may include one or more electronic storages (e.g., a set of databases accessible to one or more applications depicted in the system 100), one or more physical processors programmed with one or more computer program instructions, and/or other components. For example, the set of databases may include a relational database such as a PostgreSQL™ database or MySQL database. Alternatively, or additionally, the set of databases or other electronic storage used in this disclosure may include a non-relational database, such as a Cassandra™ database, MongoDB™ database, Redis database, Neo4j™ database, Amazon Neptune™ database, etc.

The computing devices may include communication lines or ports to enable the exchange of information with a set of networks (e.g., a network used by the system 100) or other computing platforms via wired or wireless techniques. The network may include the internet, a mobile phone network, a mobile voice or data network (e.g., a 5G or Long-Term Evolution (LTE) network), a cable network, a public switched telephone network, or other types of communications networks or combination of communications networks. A network described by devices or systems described in this disclosure may include one or more communications paths, such as Ethernet, a satellite path, a fiber-optic path, a cable path, a path that supports internet communications (e.g., IPTV), free-space connections (e.g., for broadcast or other wireless signals), Wi-Fi, Bluetooth, near field communication, or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Each of these devices described in this disclosure may also include electronic storages. The electronic storages may include non-transitory storage media that electronically stores information. The storage media of the electronic storages may include one or both of (i) system storage that is provided integrally (e.g., substantially non-removable) with servers or client computing devices, or (ii) removable storage that is removably connectable to the servers or client computing devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). An electronic storage may store software algorithms, information determined by the processors, information obtained from servers, information obtained from client computing devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent the processing functionality of a plurality of devices operating in coordination. The processors may be programmed to execute computer program instructions to perform functions described herein of subsystems described in this disclosure or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems described herein is for illustrative purposes, and is not intended to be limiting, as any of the subsystems described in this disclosure may provide more or less functionality than is described. For example, one or more of subsystems described in this disclosure may be eliminated, and some or all of its functionality may be provided by other ones of subsystems described in this disclosure. As another example, additional subsystems may be programmed to perform some, or all of the functionality attributed herein to one of the subsystems described in this disclosure.

With respect to the components of computing devices described in this disclosure, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Further, some or all of the computing devices described in this disclosure may include a user input interface and/or user output interface (e.g., a display) for use in receiving and displaying data. In some embodiments, a display such as a touchscreen may also act as a user input interface. It should be noted that in some embodiments, one or more devices described in this disclosure may have neither user input interface nor displays and may instead receive and display content using another device (e.g., a dedicated display device such as a computer screen and/or a dedicated input device such as a remote control, mouse, voice input, etc.). Additionally, one or more of the devices described in this disclosure may run an application (or another suitable program) that performs one or more operations described in this disclosure.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the words "can" or "may" are used in a permissive sense (i.e., meaning having the potential to), rather than the mandatory sense (i.e., meaning must). The words "include," "including," "includes," and the like mean including, but not limited to. As used throughout this application, the singular forms "a," "an," and "the" include plural referents unless the context clearly indicates otherwise. Thus, for example, reference to "an element" or "the element" includes a combination of two or more elements, notwithstanding the use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., a set of processors performing steps/operations A, B, C, and D) encompass all such attributes or functions being mapped to all such objects and subsets of the attributes or functions being mapped to subsets of the attributes or functions (e.g., both/all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors.

Additionally, as used in the specification, "a portion" refers to a part of, or the entirety (i.e., the entire portion), of a given item (e.g., data) unless the context clearly dictates otherwise. Furthermore, a "set" may refer to a singular form or a plural form, such that a "set of items" may refer to one item or a plurality of items.

Unless the context clearly indicates otherwise, statements that "each" instance of some collection has some property should not be read to exclude cases where some otherwise identical or similar members of a larger collection do not have the property (i.e., each does not necessarily mean each and every). Limitations as to the sequence of recited steps should not be read into the claims unless explicitly specified (e.g., with explicit language like "after performing X, performing Y") in contrast to statements that might be improperly argued to imply sequence limitations (e.g., "performing X on items, performing Y on the X'ed items") used for purposes of making claims more readable rather than specifying a sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Furthermore, unless indicated otherwise, updating an item may include generating the item or modifying an existing item. Thus, updating a record may include generating a record or modifying the value of an already-generated value in a record.

Unless the context clearly indicates otherwise, ordinal numbers used to denote an item do not define the item's position. For example, an item that may be a first item of a set of items even if the item is not the first item to have been added to the set of items or is otherwise indicated to be listed as the first item of an ordering of the set of items. Thus, for example, if a set of items is sorted in a sequence from "item 1," "item 2," and "item 3," a first item of a set of items may be "item 2" unless otherwise stated.

These and other aspects and implementations are discussed in detail herein. The detailed description includes illustrative examples of various aspects and implementations and provides an overview or framework for understanding the nature and character of the claimed aspects and implementations. The drawings provide illustration and a further understanding of the various aspects and implementations and are incorporated in and constitute a part of this specification.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computer device," "computing device," or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all implementations, and the described program components can be included in a single hardware or software product.

The phraseology and terminology used herein is for the purpose of description and should not be regarded as limiting. Any references to implementations or elements or acts of the systems and methods herein referred to in the singular may also embrace implementations including a plurality of these elements, and any references in plural to any implementation or element or act herein may also embrace implementations including only a single element. Any implementation disclosed herein may be combined with any other implementation or embodiment.

References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing implementations are illustrative rather than limiting for the described systems and methods. Scope of the systems and methods described herein is thus indicated by the appended claims, rather than the foregoing description, and changes that come within the meaning and range of equivalency of the claims are embraced therein.

What is claimed is:

1. A system for reducing hallucinations in a large language model using probabilistic sentence space expansion, the system comprising:
   one or more processors configured by computer-readable media to:
      identify a plurality of input-output pairs, each input-output pair assigned to a probability and comprising an example input text string and a corresponding output text string, the example input text string and the corresponding output text of an input-output pair each comprising a matching variable;
      sample a set of input-output pairs from the plurality of input-output pairs based on the probabilities assigned to the plurality of input-output pairs;
      generate a list of aggregated input-output pairs from the set of input-output pairs by:
         concatenating each of the example input text strings of the set of input-output pairs in a plurality of orders; and
         concatenating each of the corresponding output text strings in orders corresponding to the orders of the concatenated example input text strings;
      for each aggregated input-output pair of the list of aggregated input-output pairs, generate one or more queries by:
         identifying each variable included in the aggregated input-output pair;
         retrieving one or more values for each identified variable from a database; and
         iteratively replacing each identified variable within the aggregated input-output pair with a different value of the retrieved one or more values for the identified variable to generate a different query of the one or more queries; and
      train, using the one or more queries for each aggregated input-output pair, a first large language model to convert input queries to machine-readable prompts configured for input into a second large language model and input the machine-readable prompts into the second large language model.

2. The system of claim 1, wherein the one or more processors are further configured to concatenate each of the example input text strings by:
   retrieving one or more connectives from the database; and
   iteratively inserting each connective of the one or more connectives between each variable in the input text string.

3. The system of claim 1, wherein the one or more processors are further configured to sample the set of input-output pairs by:
   dividing the plurality of input-output pairs into one or more pair groupings; and
   selecting an input-output pair from each of the one or more pair groupings to obtain the set of input-output pairs.

4. The system of claim 1, wherein the probabilities assigned to the plurality of input-output pairs indicate how likely the input-output pair is to appear as a user-generated query.

5. A method, comprising:
   identifying a plurality of input-output pairs, each input-output pair assigned to a probability and comprising an example input text string and a corresponding output text string;
   sampling a set of input-output pairs from the plurality of input-output pairs based on the probabilities assigned to the plurality of input-output pairs;
   generating a list of aggregated input-output pairs from the set of input-output pairs by:
      concatenating each of the example input text strings of the set of input-output pairs in a plurality of orders; and
      concatenating each of the corresponding output text strings in orders corresponding to the orders of the concatenated example input text strings;
   for each aggregated input-output pair of the list of aggregated input-output pairs, generating one or more queries by:
      retrieving one or more values from a database; and
      iteratively generating a query based on the aggregated input-output pair and each of the one or more values; and
   training, using the one or more queries for each aggregated input-output pair, a first large language model to convert input queries to machine-readable prompts configured for input into a second large language model and input the machine-readable prompts into the second large language model.

6. The method of claim 5, wherein sampling the set of input-output pairs further comprises:
   dividing the plurality of input-output pairs into one or more pair groupings; and
   selecting an input-output pair from each of the one or more pair groupings.

7. The method of claim 5, wherein a computer automatically fragments each of the input-output pairs into the example input text string and the corresponding output text string.

8. The method of claim 7, wherein the computer automatically assigns the probability to each input-output pair of the plurality of input-output pairs.

9. The method of claim 5, wherein the example input text string and the corresponding output text string of the input-output pair each comprise a matching variable.

10. The method of claim 9, wherein generating the one or more queries further comprises:
   identifying each variable included in the aggregated input-output pair;
   retrieving one or more values for each identified variable from a database; and iteratively replacing each identified variable within the aggregated input-output pair with a different value of the retrieved one or more values for the identified variable to generate a different query of the one or more queries.

11. The method of claim 5, wherein iteratively generating the query further comprises:
prepending a prefix of a plurality of prefixes to the query; and
appending a suffix of a plurality of suffixes to the query.

12. The method of claim 5, wherein concatenating each of the example input text strings further comprises:
retrieving one or more connectives from the database; and
iteratively inserting each connective of the one or more connectives between each text string in the concatenated input text string.

13. The method of claim 5, wherein training the first language model further comprises validating the one or more queries according to a predetermined configuration.

14. The method of claim 5, further comprising:
adding a new input-output pair to the plurality of input-output pairs;
adjusting the probability of each input-output pair of the plurality of input-output pairs;
sampling a second set of input-output pairs from the plurality of input-output pairs based on the probabilities assigned to the plurality of input-output pairs;
generating a second list of aggregated input-output pairs from the second set of input-output pairs; and
retraining, using the one or more queries for each aggregated input-output pair of the second list of aggregated input-output pairs, the first large language model to convert input queries to machine-readable prompts configured for input into the computer model.

15. The method of claim 5, further comprising:
receiving a natural language query requesting a set of data;
executing the trained first large language model to generate a revised query;
executing the computer model using the revised query to generate a data structure comprising the requested set of data;
generating a visual representation of the data structure; and
generating a user interface containing the visual representation.

16. Non-transitory computer-readable media comprising instructions that, when executed by one or more processors, cause the one or more processors to:
identify a plurality of input-output pairs, each input-output pair assigned to a probability and comprising an example input text string and a corresponding output text string;
sample a set of input-output pairs from the plurality of input-output pairs based on the probabilities assigned to the plurality of input-output pairs;
generate a list of aggregated input-output pairs from the set of input-output pairs by:
concatenating each of the example input text strings of the set of input-output pairs in a plurality of orders; and
concatenating each of the corresponding output text strings in orders corresponding to the orders of the concatenated example input text strings;
for each aggregated input-output pair of the list of aggregated input-output pairs, generate one or more queries by:
retrieving one or more values from a database; and
iteratively generating a query based on the aggregated input-output pair and each of the one or more values; and
train, using the one or more queries for each aggregated input-output pair, a first large language model to convert input queries to machine-readable prompts configured for input into a second large language model and input the machine-readable prompts into the second large language model.

17. The media of claim 16, wherein sampling the set of input-output pairs further comprises:
dividing the plurality of input-output pairs into one or more pair groupings; and
selecting an input-output pair from each of the one or more pair groupings.

18. The media of claim 16, wherein the example input text string and the corresponding output text of an input-output pair each comprise a matching variable.

19. The media of claim 18, further causing the one or more processors to:
identify each variable included in the aggregated input-output pair;
retrieve one or more values for each identified variable from a database; and
iteratively replace each identified variable within the aggregated input-output pair with a different value of the retrieved one or more values for the identified variable to generate a different query of the one or more queries.

20. The media of claim 16, wherein iteratively generating the query further comprises:
prepending a prefix of a plurality of prefixes to the query; and
appending a suffix of a plurality of suffixes to the query.

* * * * *